(12) United States Patent
Asbery

(10) Patent No.: US 7,149,099 B2
(45) Date of Patent: Dec. 12, 2006

(54) MODELER'S POWER PANEL AND FIELD CHARGING APPARATUS, AND METHOD FOR POWERING A MODELER'S FIELD ACCESSORIES AND MODEL CONTROL DEVICES

(75) Inventor: Ray Asbery, Round Rock, TX (US)

(73) Assignee: Equalizer Industries, Inc., Round Rock, TX (US)

( * ) Notice: Subject to any disclaimer, the term of this patent is extended or adjusted under 35 U.S.C. 154(b) by 315 days.

(21) Appl. No.: 10/822,905

(22) Filed: Apr. 13, 2004

(65) Prior Publication Data
US 2005/0226020 A1 Oct. 13, 2005

(51) Int. Cl.
*H02M 1/10* (2006.01)
*H02B 1/01* (2006.01)
*H01R 4/66* (2006.01)

(52) U.S. Cl. ....................... 363/142; 361/627
(58) Field of Classification Search ................ 363/142, 363/144, 146; 361/601, 627, 631, 679, 728, 361/807, 810
See application file for complete search history.

(56) References Cited

U.S. PATENT DOCUMENTS

| | | | |
|---|---|---|---|
| 4,112,201 A | 9/1978 | Mabuchi et al. | |
| 4,405,890 A | 9/1983 | Hicks, Jr. | |
| 4,727,306 A | 2/1988 | Misak et al. | |
| 5,146,149 A * | 9/1992 | Nilssen | 320/112 |
| 5,196,779 A | 3/1993 | Alexandres et al. | |
| 5,367,995 A | 11/1994 | Kondo | |
| 5,535,713 A | 7/1996 | Braddock | |
| 5,801,503 A | 9/1998 | Kim et al. | |
| 6,493,217 B1 * | 12/2002 | Jenkins, Jr. | 361/683 |
| 6,560,131 B1 * | 5/2003 | vonBrethorst | 363/146 |
| 6,624,616 B1 | 9/2003 | Frerking et al. | |
| 6,799,993 B1 * | 10/2004 | Krieger et al. | 439/500 |

* cited by examiner

*Primary Examiner*—Matthew V. Nguyen
(74) *Attorney, Agent, or Firm*—Russell D. Culbertson; The Culbertson Group, P.C.

(57) ABSTRACT

An apparatus (10) includes a portable electric power storage arrangement (14) and a power panel (18) all mounted in or on a common housing (11) that includes a carrying feature or handle (12) by which the housing may be easily carried. The electrical power storage arrangement (14) provides DC electrical power for the power panel (18) and preferably includes one or more rechargeable batteries. Apparatus (10) further includes an inverter circuit (15) mounted in or on the housing (11) for inverting power from one or more batteries associate with the apparatus to produce a modeler's AC output. The modeler's AC power output comprises an AC power signal that is sufficient to drive an AC powered charging circuit (52) for charging batteries associated with a modeler's transmitter (53) or receiver (54).

18 Claims, 2 Drawing Sheets

MODELER'S POWER PANEL AND FIELD CHARGING APPARATUS, AND METHOD FOR POWERING A MODELER'S FIELD ACCESSORIES AND MODEL CONTROL DEVICES

TECHNICAL FIELD OF THE INVENTION

This invention relates to an apparatus for use in hobby activities involving remote-controlled vehicles. More particularly, the invention relates to an apparatus for powering a modeler's field accessories and for charging batteries used in model vehicle control devices. The invention also encompasses a method of powering a modeler's field accessories and charging batteries used in model vehicle control devices.

BACKGROUND OF THE INVENTION

Remote-controlled model aircraft, cars, and other vehicles have become very popular. These remote-controlled model vehicles commonly include an internal combustion engine for propelling the model vehicle, a battery powered receiver unit for receiving vehicle control signals from the operator or modeler, and one or more electrically driven controls for controlling the model vehicle in response to signals received through the receiver unit. The modeler uses a battery powered transmitter for transmitting control signals to the remote-controlled vehicle to operate the various controls associated with the vehicle.

A number of field accessories are commonly used by modelers operating a model vehicle such as a model airplane, helicopter, or car which is powered by one or more small internal combustion engines. A modeler's "power panel" is a portable, battery-powered device that includes one or more DC electrical outputs for powering certain field accessories commonly used in operating model vehicles. Power panels commonly include a glow plug output used to provide DC electrical energy to a glow plug associated with a model internal combustion engine. A modeler's power panel also commonly includes a fuel pump output which is used to provide DC electrical power to drive a fuel pump to pump fuel into, or out of, a fuel tank associated with a model vehicle. A starter output is also commonly included in a modeler's power panel to provide electrical power to drive a starter motor used in starting an internal combustion engine associated with a model vehicle.

A modeler's power panel and the associated battery for providing the various DC electrical outputs are commonly included in or on a housing or carrying case that allows the devices to be carried together easily in the field. This housing or carrying case commonly includes additional areas for containing accessories and other or materials used by the modeler in the field. Although these portable power panels and accessory carriers are helpful to the modeler, they do not provide support for all of the equipment used by the modeler in the field. In particular, prior art power panels do not provide support for the modeler's transmitter and receiver units or any other battery-powered devices on the model vehicle. Although battery technology has improved over the years, the batteries in a modeler's transmitter and receiver units, and other batteries that may be included on the model vehicle, still require fairly frequent charging. Especially during model vehicle competitions or shows, or any other times when the model vehicle may be operated for extended periods, it may be necessary to recharge the batteries in a transmitter unit, receiver unit, or other batteries that may be included in the model vehicle. This meant that the modeler had to leave the field to locate an AC power source which could be used to drive the various charger circuits used to recharge the transmitter or receiver batteries, or other batteries included in the vehicle.

SUMMARY OF THE INVENTION

The present invention includes both an apparatus and method for use in powering various modeler's field accessories and for use in field charging transmitter batteries and vehicle-borne batteries.

An apparatus embodying the principles of the present invention includes a portable electric power storage arrangement and a power panel mounted together in or on a common housing that includes a carrying feature or handle by which the housing may be easily carried. The electrical power storage arrangement provides DC electrical power for the power panel and preferably includes one or more rechargeable batteries. An apparatus embodying the principles of the invention further includes an inverter circuit mounted in or on the housing for inverting power from one or more batteries associated with the apparatus to produce a modeler's AC output. The modeler's AC power output comprises an AC power signal that is sufficient to drive an AC powered charger circuit for charging batteries associated with a modeler's transmitter and receiver, together with any other model vehicle-borne batteries in addition to those associated with the receiver.

The apparatus according to the invention provides the modeler's AC power output from a common unit with power panel outputs to provide a convenient way to charge transmitter batteries, receiver batteries, and other batteries in the field. Preferred forms of the invention include standard AC receptacles which can receive and power any battery charging circuit designed for use with regular house current. With these standard AC receptacles, the invention can accommodate the large variety of chargers used by various manufacturers.

Preferred forms of the invention also include a charging control circuit which is operatively connected to charge the battery or batteries included in the electrical power storage arrangement. This charging control circuit may be used to recharge the battery or batteries included in the electrical power storage arrangement given a suitable power input. The charging control circuit is preferably powered through a DC power source, and particularly an automotive DC power supply. The charging control circuit includes a suitable connector for making an electrical connection to the automotive DC power supply and also preferably includes a source monitoring arrangement for monitoring the automotive DC power supply and preventing charging operations that would overly discharge a battery associated with the automotive DC power system.

A method according to the invention includes supplying an appropriate DC electrical output from an electrical power storage arrangement to a modeler's field accessory power output. The method also includes inverting the DC output from the electrical power storage arrangement to produce a modeler's AC output. The method may further include the step of charging the electrical power storage arrangement form any DC automotive electrical power system. The modeler's AC power output produced from the electrical power storage arrangement may be applied to a suitable battery charging circuit to charge one or more batteries associated with a model control device such as a transmitter or receiver.

These and other advantages and features of the invention will be apparent from the following description of the preferred embodiments, considered along with the accompanying drawings.

DESCRIPTION OF PREFERRED EMBODIMENTS

Figure 1:
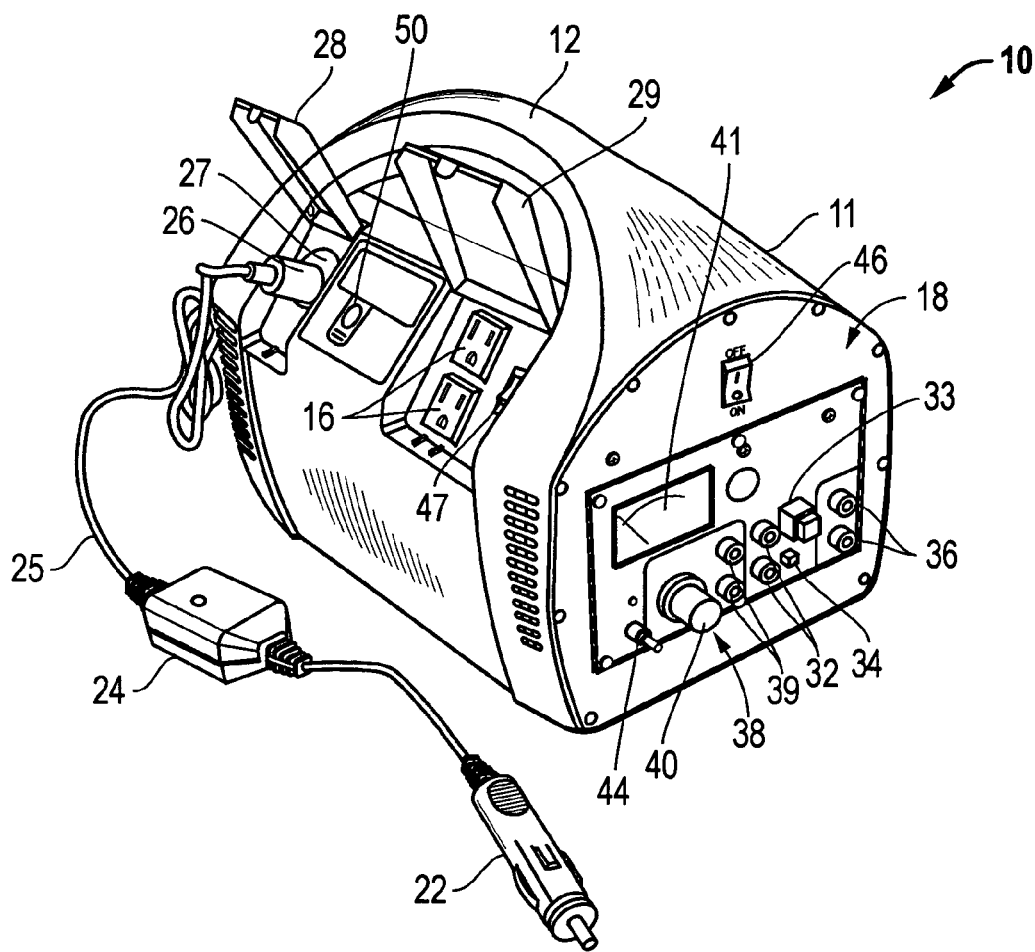
FIG. 1 is a view in perspective of an apparatus embodying the principles of the invention.

Referring to FIG. 1, an apparatus 10 embodying the principles of the invention includes a housing 11 having at least one carrying feature. The carrying feature in the illustrated embodiment comprises a single handle 12 extending longitudinally along the top of housing 11. Alternative carrying features within the scope of the invention may include multiple handles similar to that shown in FIG. 1, or multiple ledges or other surfaces at different locations on the housing by which apparatus 10 may be lifted. In any event, the carrying feature or features on housing 11 allow apparatus 10 to be lifted and carried easily by hand.

Figure 2:
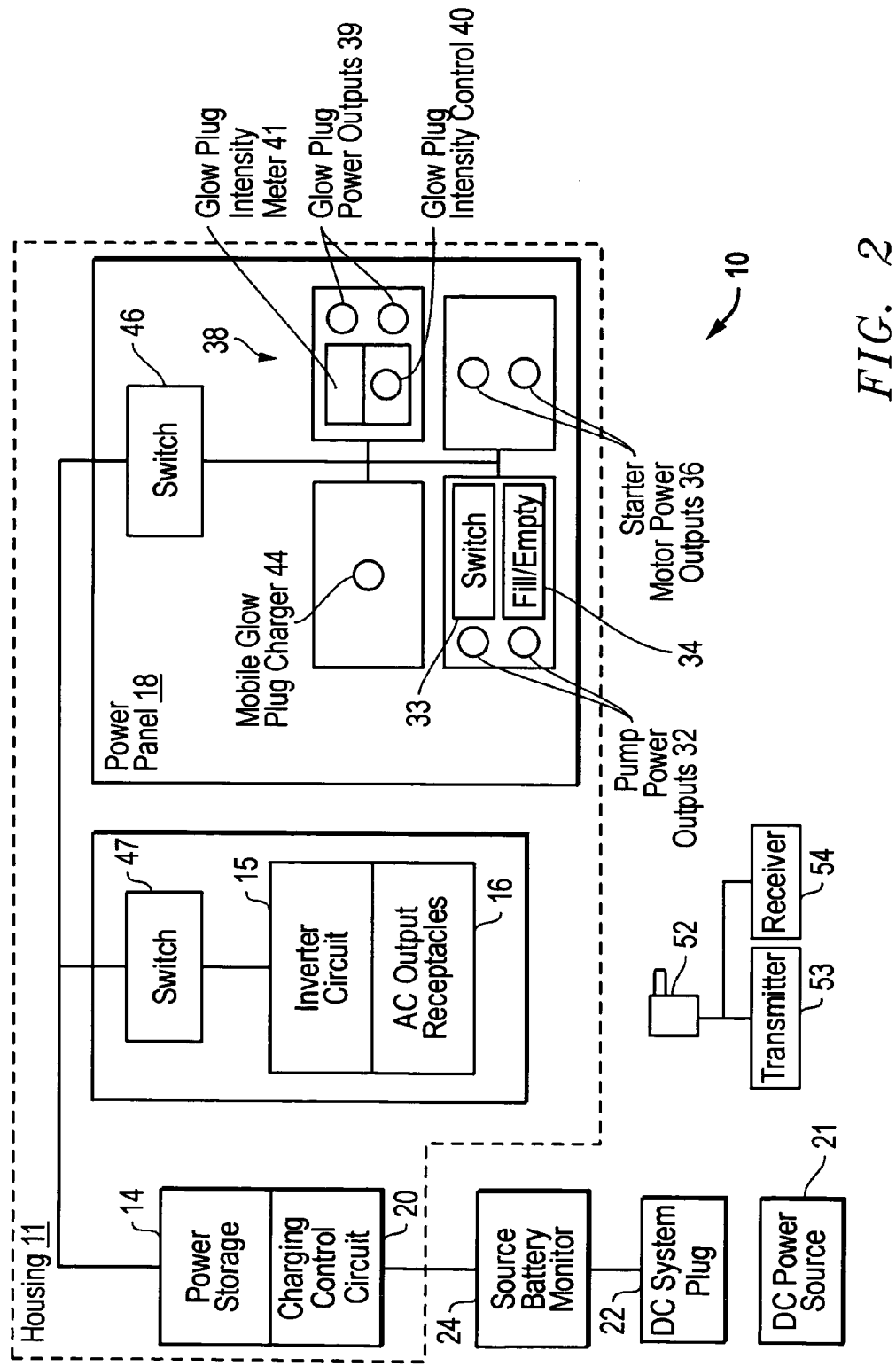
FIG. 2 is a block diagram showing the various electrical components included in the apparatus shown in FIG. 1.

As shown in the block diagram of FIG. 2, apparatus 10 includes an electrical power storage arrangement 14 mounted within housing 11. An inverter circuit 15 is also included with apparatus 10 for inverting an output of electrical power storage arrangement 14 to produce a modeler's AC power output which is available at AC output receptacles 16 shown both in FIGS. 1 and 2. FIGS. 1 and 2 also both show that apparatus 10 includes a modeler's power panel generally indicated at reference numeral 18. Power panel 18 is connected to housing 11 and, as shown in FIG. 2, is operatively connected to receive power from electrical power storage arrangement 14. Although the illustrated power panel 18 includes a number of power outputs for various modeler's field accessories, other forms of the invention may include only a single DC output for powering a modeler's accessory. The various power outputs of the illustrated power panel 18 will be described in detail below.

The preferred electrical power storage arrangement 14 includes one or more rechargeable batteries. The invention is not limited to any particular battery technology. For example, power storage arrangement 14 may include one or more lead acid batteries, nickel/cadmium batteries, lithium ion batteries, or nickel metal hydride batteries. It will be appreciated that in some forms of the invention one or more batteries may be used to power inverter circuit 15, while a different set of one or more batteries may be used to provide electrical power to power panel 18. Alternatively, one battery or multiple batteries may be connected to provide power to both inverter circuit 15 and power panel 18.

The illustrated form of the invention includes a charging control circuit 20 shown in FIG. 2. Charging control circuit 20 is operatively connected to electrical power storage arrangement 14 and is adapted to charge the electrical power storage arrangement when the charging control circuit is powered. Charging control circuit 20 is preferably powered through a DC power source 21. The illustrated apparatus 10 thus includes a DC system plug or other interface device 22 that may be connected to a corresponding interface (not shown) associated with DC power source 21. A particular form of the present invention is adapted to interface with a DC power source 21 comprising an automotive power system. In this case, DC system plug 22 is adapted to be received in a cigarette lighter or other similar power outlet receptacle commonly available in cars, SUVs, trucks, and similar vehicles. These types of vehicles commonly include a 12 volt DC power system suitable for charging the batteries or other storage devices included in power storage arrangement 14 shown in FIG. 2.

The particular type of charging control circuit 20 included in apparatus 10 may vary from one preferred form of the apparatus to another. Generally, charging control circuit 20 comprises any suitable circuit for controlling the charging of batteries included in power storage arrangement 14 given the particular power storage arrangement used in the apparatus 10 and given the power source from which power storage arrangement is to be charged. For example, circuit 20 may include elements to control a DC input to a suitable level DC charging signal. Circuit 20 may further include an arrangement for monitoring the condition of storage arrangement 14 and for controlling the DC charging signal based on that monitored condition. Still other forms of the invention may include circuitry for rectifying an AC power signal and stepping the AC voltage down to an appropriate level for charging storage arrangement 14. This AC conditioning circuitry may be in addition to the DC conditioning circuitry so that storage arrangement 14 may be charged either from a DC source as described below or an AC source. It will be appreciated, however, that charging control circuitry, especially for an AC input, may be included in a unit separate from apparatus 10.

In preferred forms of apparatus 10 that are adapted to be charged through a DC power source 21 such as an automotive power system that itself relies on one or more batteries, care must be taken that the process of charging power storage arrangement 14 does not unduly discharge the battery associated with the DC power source 21. In this light, some preferred forms of apparatus 10 further include a DC source monitoring device 24 operatively connected to charging control circuit 20. This monitoring device is adapted to be interposed between DC power source 21 and charging control circuit 20 and to monitor the condition of a source battery (not shown) associated with the DC power source. When DC source monitoring device 24 detects a predefined discharge level in a battery associated with DC power source 21, the monitoring device is operative to cause the charging circuit 20 to discontinue charging electrical power storage arrangement 14. Thus, a version of apparatus 10 including monitoring device 24 may be connected to an automotive power system through plug 22 and left unattended to charge storage arrangement 14 without the danger of unduly discharging or damaging the battery associated with the automotive power system. In the preferred form of the invention illustrated in FIG. 1, DC source monitoring device 24 is permanently connected in a power cord 25 that terminates at one end with plug 22 and terminates at the opposite end with a connector 26 adapted to connect with a corresponding socket or receptacle 27 mounted on housing 11. A cover 28 may be included on housing 11 to cover the exposed socket 27 when not in use. A similar cover 29 may be included to protect AC receptacles 16 when not in use.

The illustrated power panel 18 includes four separate sets of outputs. Pump outputs 32 comprise positive and negative DC outputs that may be supplied to a DC driven pump (not shown) for pumping fuel into or out of a model vehicle fuel tank (also not shown). Pump outputs 32 may be controlled by two separate switches. A first switch 33 comprises an on/off switch to selectively enable and disable power to pump outputs 32. Second switch 34 comprises a toggle switch that may placed in two alternative positions to switch the polarity of the outputs 32 and thus reverse the pump operation. Outputs 36 comprise positive and negative terminals that may be connected to power a DC starter motor (not shown) that may be used to turn or crank the model vehicle engine (also not shown). It will be noted that there is no separate switch shown for outputs 36 because the starter motor itself commonly includes a switch to selectively activate and deactivate the starter motor. Finally, illustrated power panel 18 includes two different glow plug output arrangements. A first glow plug output arrangement 38 includes outputs 39, intensity control 40, and intensity meter 41. Outputs 39 may be connected directly to a model vehicle engine glow plug (not shown) using a suitable connecting cord (also not shown) to energize the glow plug. Control 40 may be used to control the current applied to energize the glow plug. A second glow plug output 44 includes an output to which a mobile glow plug energizer (not shown) may be connected to charge the mobile glow plug energizer.

Both power panel 18 and inverter circuit 15 are associated with a respective master switch, 46 and 47, respectively. Power panel master switch 46 is connected between power storage arrangement 14 and power panel 18 to allow a user to selectively disable the power panel. Inverter master switch 47 is operatively connected between power storage arrangement 14 and inverter circuit 15 to enable a user to selectively disable the inverter circuit and prevent unnecessary drain on the power storage arrangement. Apparatus 10 may also include a master switch 50 (shown only in FIG. 1) that can be operated to selectively disable the entire apparatus.

A method according to the present invention includes supplying an appropriate DC output from an electrical power storage arrangement 14 to a modeler's field accessory power output such as one of the output terminal arrangements 32, 36, 39, or 44 shown in FIGS. 1 and 2. The method further includes inverting the DC output from the electrical power storage arrangement 14 to produce a modeler's AC output. This inversion from the power storage arrangement DC power to AC power may be performed by the inverter circuit 15 shown in FIG. 2 and the resulting AC signal may be applied to AC receptacles 16 shown in both FIGS. 1 and 2. Since the electrical power storage arrangement 14 is mounted on a readily portable housing, both the field accessory output and the AC output may be applied in the field, far away from any fixed AC power source. In particular, the field accessory output may be applied to power a modeler's field accessory while at the same time, or at different times, AC power may be applied from receptacles 16 to power a suitable AC to DC battery charging circuit 52. The battery charging circuit 52 may charge batteries associated with the modeler's transmitter unit 53, receiver unit 54, and any additional batteries that may be included with a model vehicle (not shown) to actuate various model vehicle control devices.

The ability to power a modeler's field accessory and also charge the batteries associated with transmitter 53 and receiver 54 from a common apparatus 10 is in itself a major advantage. It is also highly advantageous to power the charging circuit 52 using AC power. The reason for this is that there are many different types of charging circuits and especially charging circuit connectors for connecting to the particular transmitter or receiver to be recharged. These charging circuits have traditionally be designed to operate on standard AC house current. In order to use such a AC charging circuit 52 with the present invention, it is only necessary to activate the inverter circuit 15 and connect the AC charging circuit to one of the standard AC receptacles 16, which is preferably adapted to supply standard AC current. The AC charging circuit 52 may then be connected to transmitter 53 or receiver 54 in the normal fashion to recharge the batteries associated with those devices. Although it would be possible to apply a DC charging current directly from apparatus 10, it would then be necessary to modify the DC charging circuit to accommodate various manufacturer's equipment and also use various connector adapters to ensure that the device could be connected to the equipment to be recharged.

Since preferred forms of the invention include an arrangement for receiving power from a DC automotive power system to recharge electrical power storage arrangement 14, a method according to the present invention may further include the step of charging the electrical power storage arrangement from a DC automotive power system. Thus, it is possible to use the present invention without ever having to charge the apparatus from a fixed AC power source. Monitoring device 24 may be employed to monitor the DC power system while charging electrical power storage arrangement 14, and to discontinue charging in response to a predetermined discharge level monitored from the DC power system.

The above described preferred embodiments are intended to illustrate the principles of the invention, but not to limit the scope of the invention. Various other embodiments and modifications to these preferred embodiments may be made by those skilled in the art without departing from the scope of the following claims.

The invention claimed is:

1. An apparatus including:
   (a) a housing having at least one carrying feature;
   (b) a battery mounted within the housing;
   (c) an inverter circuit for inverting an output of the battery to produce a modeler's AC power output; and
   (d) a modeler's power panel connected to the housing and operatively connected to receive power from the battery, the modeler's power panel being located on an exterior surface of the housing and including a modeler's DC pump output, a modeler's DC glow plus output, and a modeler's DC starter output.

2. The apparatus of claim 1 farther including a battery charging control circuit operatively connected to the battery for charging the battery when the charging control circuit is powered.

3. The apparatus of claim 2 further including a source battery monitoring device operatively connected to the charging control circuit and adapted to be connected to a DC power source, the source battery monitoring device for discontinuing a charging operation charging the battery when the DC power source reaches a predefined discharge level.

4. The apparatus of claim 1 further including a master switch operatively connected to the modeler's power panel to selectively disable the modeler's power panel from receiving power from the battery.

5. The apparatus of claim 1 wherein the battery is adapted to be charged by a standard 12 volt DC automotive power system.

6. The apparatus of claim 1 further including an inverter master switch operatively connected to the inverter circuit for selectively disabling the inverter circuit.

7. An apparatus including:
   (a) a housing having at least one carrying feature;

(b) an electrical power storage arrangement mourned within the housing;

(c) an inverter circuit for inverting an output of the electrical power storage arrangement to produce a modeler's AC power output; and (d) a modeler's power panel connected to the housing and operatively connected to receive power from the electrical power storage arrangement, the modeler's power panel being located on an exterior surface of the housing and including at least one of a modeler's DC pump output, a modeler's DC glow plug output, and a modeler's DC starter output.

8. The apparatus of claim 7 further including a charging control circuit operatively connected to the electrical power storage arrangement for charging the electrical power storage arrangement when the charging control circuit is powered.

9. The apparatus of claim 8 further including a DC source monitoring device operatively connected to the charging control circuit and adapted to be connected to a DC power source, the DC source monitoring device for discontinuing a charging operation charging the electrical power storage arrangement when the DC power source reaches a predefined discharge level.

10. The apparatus of claim 7 when the modeler's power panel includes the modeler's DC pump output, the modeler's DC glow plug output, and the modeler's DC starter output.

11. The apparatus of claim 7 further including a master switch operatively connected between the electrical power storage arrangement and the modeler's power panel to selectively disable the modeler's power panel.

12. The apparatus of claim 7 wherein the electrical power storage arrangement is adapted to be charged by a standard 12 volt DC automotive power system.

13. The apparatus of claim 7 further including an inverter master switch operatively connected to the inverter circuit for selectively disabling the inverter circuit.

14. A method including the steps of:

(a) supplying an appropriate DC output from an electrical power storage arrangement to at least one modeler's DC pump output, a modeler's DC glow plug output, and a modeler's DC starter output, the electrical power storage arrangement being mounted in a readily portable housing and the at least one of the modeler's DC pump output, modeler's DC glow plug output, and modeler's DC starter output being located so as to be accessible from outside the readily portable housing; and (b) inverting the DC output from the electrical power storage arrangement to produce a modeler's AC output.

15. The method of claim 14 further including the step of charging the electrical power storage arrangement from a DC automotive power system.

16. The method of claim 15 further including the step of monitoring the DC automotive power system while charging the electrical power storage arrangement, and discontinuing charging in response to a predetermined discharge level monitored from the DC automotive power system.

17. The method of claim 14 further including supplying the DC power output from the electrical power storage arrangement to each of the modeler's DC pump output, the modeler's DC glow plug output, and the modeler's DC starter output.

18. The method of claim 14 further including the step of applying the modeler's AC output to a battery charging circuit to charge a battery associated with a model control device.

* * * * *

UNITED STATES PATENT AND TRADEMARK OFFICE
CERTIFICATE OF CORRECTION

PATENT NO. : 7,149,099 B2  Page 1 of 1
APPLICATION NO. : 10/822905
DATED : December 12, 2006
INVENTOR(S) : Ray Asbery It is certified that error appears in the above-identified patent and that said Letters Patent is hereby corrected as shown below:

At column 1, line 52:
  Change "other or materials" to --other materials--.

At column 2, line 62:
  Change "form any DC" to --from any DC--.

At column 6, line 43:
  Change "DC glow plus" to --DC glow plug--.

At column 6, line 45:
  Change "claim 1 farther" to --claim 1 further--.

At column 7, line 1:
  Change "arrangement mourned" to --arrangement mounted--.

At column 8, line 6:
  Change "at least one modeler's" to --at least one of a modeler's--.

Signed and Sealed this

Sixth Day of March, 2007

JON W. DUDAS
*Director of the United States Patent and Trademark Office*